United States Patent
Chase

[11] Patent Number: 5,205,597
[45] Date of Patent: Apr. 27, 1993

[54] FLEXIBLE GRILLE

[75] Inventor: Lee A. Chase, Ada, Mich.

[73] Assignee: Lacks Industries, Inc., Grande Rapids, Mich.

[21] Appl. No.: 787,558

[22] Filed: Nov. 4, 1991

[51] Int. Cl.⁵ .............................................. B62D 25/08
[52] U.S. Cl. ..................................... 293/115; 180/68.6
[58] Field of Search ................ 296/189; 293/115, 132; 180/68.6

[56] References Cited

U.S. PATENT DOCUMENTS

| | | | |
|---|---|---|---|
| 4,645,250 | 2/1987 | Bauer et al. | 293/115 |
| 4,753,468 | 6/1988 | Szymczak et al. | 293/132 |
| 4,834,436 | 5/1989 | Nguyen | 293/115 |
| 4,917,203 | 4/1990 | Sacco et al. | 180/68.6 |
| 4,944,540 | 7/1990 | Mansoor et al. | 293/115 |

Primary Examiner—Robert R. Song
Attorney, Agent, or Firm—Remy J. VanOphem

[57] ABSTRACT

A flexible automobile grille which accommodates the movement of an impact-absorbing bumper. The grille is capable of deflecting with the stroke of the impact-absorbing bumper during impact without the need for the grille to be either pivotable about an anchor point or to be mechanically displaceable with special hardware. The material of the grille is selected to have a yield strength which is adequate to sustain a predetermined degree of yielding corresponding to the amount of deflection required with the bumper's stroke. The grille includes a generally elongated body portion having an upper edge and a lower edge which extend horizontally adjacent the engine hood and the bumper, respectively. Both the upper and lower edges may be configured to attach to the automobile. To provide the necessary deflection capability of the grille, the lower edge has a section modulus which varies along its length, having at least one minimum section so as to provide a predetermined degree of yielding at the minimum section without exceeding the predetermined yield strength of the material. As a result, the predetermined degree of yielding of the lower edge provides a degree of resiliency to the entire automobile grille, allowing the grille to be firmly attached to the automobile body while still being able to flex sufficiently so as to be able to deflect with the bumper during an impact.

25 Claims, 2 Drawing Sheets

FLEXIBLE GRILLE

BACKGROUND OF THE INVENTION

1. Field of the Invention

The present invention generally relates to automobile grilles positioned at the automobile's front end. More specifically, this invention relates to an automobile grille which is capable of elastic deformation yet is rigidly directly or indirectly attached to the engine hood, front end automobile body panel, automobile bumper, or a combination thereof. The flexible grille is able to withstand substantial flexure when the automobile bumper sustains an impact by an object. The flexible grille of the present invention is particularly well suited for use with impact-absorbing bumpers which automatically rebound from a frontal impact.

2. Description of the Prior Art

Automobile grilles have generally evolved from what once was primarily a safety barrier to protect an individual from injury as well as to prevent damage to an automobile's radiator to its present status as primarily a decorative feature, though also often serving as the primary source of ventilation to the radiator. Accordingly, the earlier grilles were formed from metal so as to have adequate strength to deflect objects from hitting the radiator. Today, the role of the automobile grille as a barrier has been largely supplanted by modern practices which position the radiator such that it is protected by other means. But for styling purposes, the automobile grille is still present on most modern automobiles, though generally formed from plastic to save weight.

With the advent of energy or impact-absorbing bumpers, automobile grilles have been required to undergo significant design changes in order to accommodate the stroke of the bumper, which commonly can be as much as 3 to 4 inches. Current grille designs have primarily taught three solutions to this problem. The first and traditional solution is to position the grille entirely out of the path of the bumper during recoil after impact. This approach generally entails placing the automobile grille rearward of the bumper, resulting in an extremely square-looking profile which has little appeal according to modern design trends. In addition, such a design is not aerodynamic, and as such this approach is not generally followed, particularly as fuel efficiency becomes increasingly important. A second solution is to completely eliminate the grille, which generally entails sweeping the engine hood down such that it is suspended just above the bumper line. However, this approach has not been widely adopted in that it has rather limited styling appeal. A third solution is to require the grille to be displaceable such that it can pivot or otherwise move out of the bumper's path during energy-absorbing impact. Preferably, this approach allows the grille to be mounted flush with the surrounding hood, front end, body panels and bumper so as to enhance the styling and aerodynamics of the automobile. Such an approach is illustrated by U.S. Pat. No. 3,792,889 to Fuener et al. There, a sequentially moving grille is taught in which the lower edge of the grille is pivotally secured to the automobile body while the upper edge of the grille is allowed to rotate about the lower edge. The upper edge is biased by a spring element in cooperation with a guide rod such that the upper edge is normally flush with the adjacent body panel of the automobile. During impact the rearward travel of the bumper forces the grille to pivot rearwardly about the lower edge and against the spring element.

Another example of the third solution is taught by U.S. Pat. No. 4,753,468 to Szymczak et al, which provides a pivot arm which pivots the grille rearwardly and upwardly during impact. Yet another example is shown in U.S. Pat. No. 4,834,436 to Nguyen, which substantially eliminates the arcuate displacement of the grilles of both Fuener et al and Szymczak et al by employing a four-bar linkage that displaces the grille in an entirely rearward manner during impact. U.S. Pat. No. 4,944,540 to Mansoor et al also seeks to avoid an arcuate path by the grille during impact by a pin and slot arrangement having a return spring.

As can be readily appreciated by those skilled in the art, the above examples corresponding to the third solution all entail additional hardware and space considerations to accommodate the displacement of the grille. In addition, the added hardware is also necessary to adequately support the grille so as to be able to withstand wind resistance and road vibration while the vehicle is in use. But the additional hardware requirement itself is a disadvantage when it comes to both costs and weight from the standpoint of the vehicle manufacturer. The added costs entailed in purchasing and installing the above necessary hardware to achieve the desired results will generally be substantial, while the additional weight penalty adversely affects the performance and fuel economy of the vehicle. Both considerations are of primary importance with the present highly competitive automobile market.

An approach which tends to avoid the problems noted above is illustrated in U.S. Pat. No. 2,578,068 to Johnson. Johnson teaches a resilient grille and bumper combination which is resiliently attached at its lower edge to the automobile's frame. Johnson further teaches that the combined grille and bumper combination is capable of only a small predetermined amount of flexing or pivotal movement upon engagement with an object. A more modern version of this approach is illustrated by U.S. Pat. No. 4,917,203 to Sacco et al. There, a grille is disclosed which is supported within a radiator cover. The radiator cover is secured to and suspended from the engine hood by resilient inner plates which allow the radiator cover to pivot elastically about the edge of the hood when the bumper is impacted. An advantage to the above structure is that the added hardware and weight noted with the teachings of Fuener et al, Szymczak et al, Nguyen, and Mansoor et al is avoided. In addition, Sacco et al particularly illustrate the styling and aerodynamic benefits to the automobile when the grille is mounted flush with the surrounding body panels and bumper.

However, the grilles taugh by both Johnson and Sacco et al have two significant disadvantages. First, the space requirements for the arcuate motion, recognized as being undesirably by Nguyen, are again present. As can be seen with the radiator cover of Sacco et al, the arcuate motion of the entire radiator cover assembly requires a large arcuate path and a suitable stop to allow the radiator cover to deflect during impact. Consequently, a significant amount of space must be provided for the radiator cover to be displaced within the front end of the automobile. Secondly, the radiator cover can only be attached along one edge so as to allow the resilient pivot action between the radiator cover and the hood. The Sacco et al radiator cover is entirely suspended from the engine hood in a cantilever arrangement. As a consequence, the radiator cover is highly susceptible to wind and road vibrations, clearly an undesirable characteristic.

An obvious solution to this problem would be to make the inner plates taught by Sacco et al stiffer. But to do so would largely defeat the requirement that the radiator cover assembly be sufficiently resilient to deflect during impact. A second alternative solution to this problem would be to secure the lower edge of the radiator cover to the body of the automobile. However, to do so would prevent the radiator cover from deflecting as intended, thus reducing its capability to resiliently deflect with the bumper during impact.

From the above discussion, it can be readily appreciated that the prior art does not disclose an automobile grille which has both the advantages of being able to move with the bumper during impact and being sufficiently supported by the automobile body, while simultaneously avoiding the need for added hardware and weight for purposes of providing the movement and support features. Nor does the prior art teach or suggest an attempt to modify the structure of an automobile grille itself to provide a predetermined resiliency which would enable the grille to deflect with the bumper and absorb an impact with the bumper while still remaining securely attached to the automobile body.

Accordingly, what is needed is a cost-efficient automobile grille capable of being mounted substantially flush to the surrounding automobile front end body panels and/or bumper which can be rigidly attached to the automobile body front end panels to withstand wind and road vibration without the need for additional hardware, while also being provided with a predetermined degree of elasticity in critical areas of the grille such that the yield strength of the grille's material will not be exceeded during impact and displacement of the bumper and allow the grille to return to its initial position without any adverse effects as a result of the impact and/or movement.

SUMMARY OF THE INVENTION

According to the present invention there is provided an automobile grille for an automobile having an impact-absorbing bumper. The grille of the present invention is designed to be mounted substantially flush with the surrounding automobile body panels and bumper while also being capable of deflecting with the stroke of the impact-absorbing bumper during impact, thereby obviating the need for the grille to either pivot about an anchor point or to be mechanically displaceable with additional hardware. Consequently, the grille is preferably formed entirely from a resilient, impact resistant material, such as a high impact plastic. The material must be selected to have a yield strength which is adequate to sustain a predetermined degree of yielding corresponding to the amount of deflection required to deflect with the bumper's stroke, as will be explained more fully below.

The grille includes a generally elongated body portion which extends across a portion of the automobile's front end as determined by the automobile's particular design. The body portion is generally the patterned central portion of the grille, often including a cross hatch or vertical arrangement of slats. The body portion has an upper edge which generally extends horizontally adjacent the engine hood of the automobile, and a lower edge which generally extends horizontally adjacent to the bumper. The upper edge will generally be configured to attach to the automobile, depending upon the preference for a particular design and nature of the application. As such, the upper edge will typically be attached either to the engine hood or at another convenient location on the front end of the automobile based upon the design criteria and application. The lower edge is formed along its sides with attachment portions adapted for attachment to the automobile, either to the automobile body or the bumper, or bumper fascia, or both. An intermediate constant cross sectional member may be provided which extends generally horizontally between the upper and lower edges.

To selectively provide the necessary deflection capability of the grille, one or more of the upper or lower edges or the intermediate member has a variable section modulus along its length. Preferably, at least the lower edge has a section modulus which is reduced in at least one predetermined area so as to provide a predetermined degree of elasticity without exceeding the predetermined yield strength of the material. The section modulus may also vary such that there is a predetermined minimum section modulus at one or more points along the lower edge. As a result, the predetermined degree of elasticity or of the lower edge provides a degree of resiliency to the entire automobile grille.

With the above capability for flexing, the grille can be attached to the automobile body panel or hood at points along the upper edge and the sides to firmly support the grille, while still being able to elastically deform sufficiently so as to be able to both sustain a predetermined impact or to stroke with the bumper during an impact without exceeding the predetermined yield strength of the material. Due to the localization of the flexing in predetermined areas of the grille, the deflection in the remainder of the body portion away from the predetermined areas is significantly reduced. As a result, the likehood of permanent yielding occurring in the grille is eliminated.

According to a preferred aspect of this invention, reducing the section modulus at one or more predetermined points along the lower edge of the body portion of the grille allows the upper edge to be rigidly attached to the automobile. Consequently, there is no requirement for the grille to be pivotable about the upper edge when the bumper sustains an impact. In addition, the need for additional hardware or special resilient fasteners is reduced or eliminated.

In addition, the lower edge can also be attached to the fascia of the automobile body to firmly anchor the grille to the automobile. Typically, the grille is formed to be arcuate and extends across a portion of the front end of the automobile. Accordingly, the lower edge is also arcuate and extends the entire width of the grille terminating at oppositely disposed ends, adjacent portions of the automobile body panels. With the ability of the lower edge to deflect along its length, the ends of the lower edge can also be secured to the automobile body. With this arrangement, it will generally be desirable that the lower edge deflect in the central portion of the lower edge, requiring at least one predetermined section of reduced section modulus located at or near the central portion of the lower edge.

In addition, a significant advantage of the present invention is that the section modulus of the lower edge can be readily modified when formed as an edge member which extends in a direction substantially perpendicular to the body portion of the grille. By varying the width of the edge member, the section modulus of the lower edge can be readily modified without affecting the exterior appearance of the grille. As a result, the optimum section modulus for different applications can be experimentally ascertained by either modifying the mold which forms the lower edge, or by mechanical means to contour and remove material from the edge member.

Accordingly, it is an object of the present invention to provide an automobile grille which is able to withstand a predetermined impact without fracturing.

It is a further object of this invention that such an automobile grille be suitable for use on an automobile having an impact-absorbing bumper such that the automobile grille is capable of resiliently deflecting with the stroke of the bumper without sustained structural damage.

It is a further object of this invention that such an automobile grille be provided with a reduced section modulus in at least one area thereof for concentrating the deflection in that area of the grille while substantially reducing the flexure in the remainder of the grille.

It is another object of this invention that, by concentrating the flexure of the grille in predetermined areas, the grille can be rigidly attached to the automobile body panels without the need for additional pivoting hardware or resilient brackets to support the grille.

It is yet another object of this invention that such a grille be securable to the automobile body at both its upper edge and side portions of the lower edge provide structural resistance to environmental effects such as wind and vibration.

It is still another object of this invention that such a grille have reduced costs, component weight and complexity provide the ability for the grille to appropriately respond to bumper impacts.

Other objects and advantages of this invention will be more apparent after a reading of the following detailed description taken in conjunction with the drawings provided.

DETAILED DESCRIPTION OF THE PREFERRED EMBODIMENT

Figure 1:
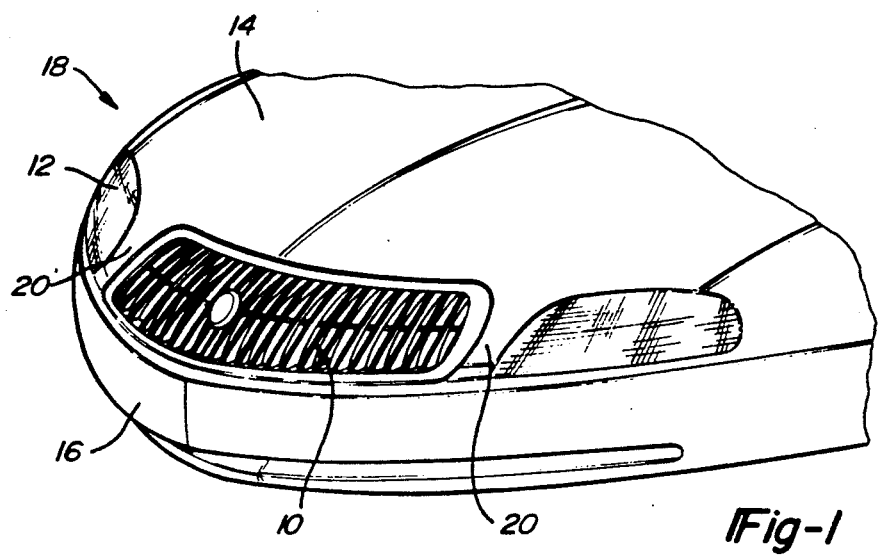
FIG. 1 is a perspective view of an automobile front end having an impact-absorbing bumper and a grille in accordance with the preferred embodiment of this invention.

With reference to FIG. 1, there is shown an automobile front end portion 18 having a flexible grille 10 secured to its front end sheet metal panels. As illustrated, the grille 10 is mounted to the forward edge of an engine hood 14 between a pair of downward extending hood structures 20. The downward extending hood structures 20 separate the grille 10 from a pair of headlamps 12. In this position, the grille is suspended above a front bumper 16 of the automobile front end portion 18. According to the preferred embodiment, the grille 10 can be mounted so as to be substantially flush with its surrounding automobile body panel structure, such as the bumper 16, hood 14 and downward extending hood structure 20, as shown in FIG. 1.

In current automobiles, the bumper 16 is an impact-absorbing bumper which is designed to withstand and absorb a predetermined impact without permanent deformation. At this time, such a bumper 16 is required to absorb a 5 mile per hour impact, after which the bumper 16 must return to its pre-impact position. During the course of an impact, the bumper 16 will travel rearward of the automobile front end portion 18 three inches or more. After impact in which the energy of the impact has been dissipated through the resilient structure of the bumper 16, the bumper 16 will return to its original position.

Because of the resilient nature of the bumper 16, the grille 10 of the present invention is also required to resiliently respond to an impact to the bumper 16, particularly when the grille 10 is mounted substantially flush with the bumper 16. Accordingly, the material and structure of the grille 10 must be such that the elasticity within the grille 10 acts to absorb the impact without the grille 10 fracturing. As an initial matter, the material of the grille 10 must have sufficient impact resistance to be durable in the hostile environment of the bumper 16. Accordingly, the grille 10 is preferable formed from a high impact plastic such as polycarbonate (PC) or acrylonitrile-butadiene-styrene (ABS) or a modified PC/ABS.

More importantly, for purposes of the present invention the flexibility of the grille 10 must be provided by its structure such that the grille 10 will more readily bend at predetermined locations. As a result, the stresses during impact will be concentrated in regions of the grille 10 better able to absorb them while minimizing the effect of the impact upon the remainder of the grille 10 or the vehicle body. The basis for this capability is that the rigidity of a structural member is dependent upon its section modulus. Briefly, the section modulus is the member's moment of inertia about its neutral bending axis divided by the distance between the neutral axis and the highest-stressed fiber of the member. The section modulus is entirely a property of the shape and size of the cross section of the member.

The section modulus allows one to calculate the maximum stress in a member according to the equation:

$$S = M/(I/c)$$

where S is the maximum stress (at the highest-stressed fiber located a distance c from the neutral axis of the member—generally, the outermost fiber of the member, M is the bending moment on the member, and I/c is the section modulus. Accordingly, with a constant bending moment M, any increase in the section modulus I/c (roughly, any increase in the cross section of the member) will proportionally reduce the stress S in the outermost fiber of the member, thereby necessitating a higher load to produce a fracture in the member.

A secondary consideration for evaluating the stress in a member is based upon its deflection characteristics. The formula for calculating the deflection in a beam is given by:

$$f = Pl^3/mEI$$

where f is the measurable deflection in the beam, P is the deflection load, l is the span of the beam, m is a coefficient determined by the manner in which the beam is supported, E is Young's modulus for the material, and I is the cross section's moment of inertia about the neutral bending axis. As will be more fully described below, a decrease in the section modulus I/c produces an increased deflection f in the member under a constant load P. Accordingly, by varying the section modulus of a member and maintaining a constant deflection the stress can be substantially influenced. This relationship will be discussed more fully below in conjunction with a more detailed description of the construction of the grille 10 of the present embodiment.

Figure 2:
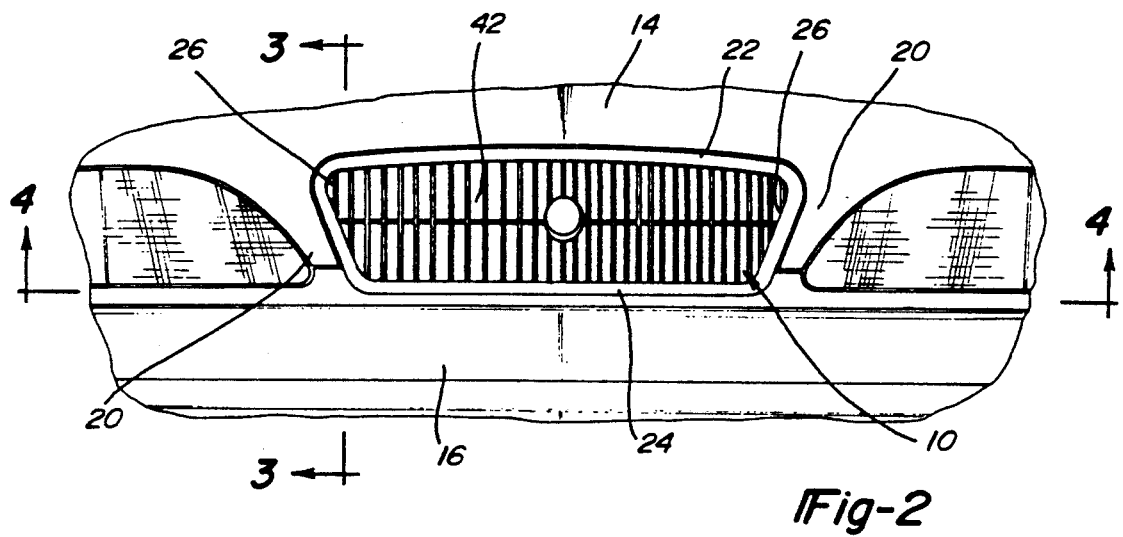
FIG. 2 is a frontal view of the automobile front end of FIG. 1.
Figure 3:
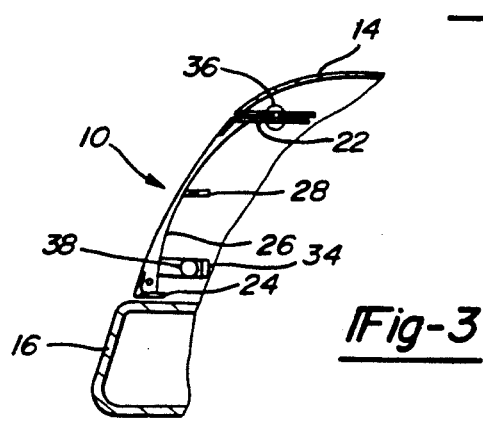
FIG. 3 is a cross-sectional view of the automobile front end taken along line 3—3 of FIG. 2 in accordance with the preferred embodiment of this invention.

As seen in FIG. 2, the grille 10 includes an upper support member 22, a lower support member 24, and a pair of vertical support members 26 disposed at opposite ends of the grille 10. The body of the grille 10 will typically have a plurality of cross-hatch members or, as shown, a plurality of vertical grille members 42 for both cosmetic and structural purposes. As best seen in FIG. 3, the grille 10 may also include an intermediate member 28 which runs parallel to both the upper and lower support members 22 and 24.

The upper and lower support members 22 and 24 are generally formed to be elongate with a rectangular or "C" cross section to provide rigidity and structural support to the grille 10. The horizontal depth, or thickness, of each cross section particularly provides rigidity to forces acting in the horizontal plane, such as frontal impacts to the grille 10. The cross section of the intermediate member 28 can be any suitable horizontal depth, depending upon the specific elasticity characteristics sought and the manner of anchoring the grille 10 to the automobile 18 and the desired direction of deformation.

As shown in FIG. 3, the grille 10 can be rigidly attached to the forward hood structure 20 along the upper support member 22 and to dependent portions of the forward hood structure 20 along the vertical supports 26 with fasteners 36 and 38, respectively. Any suitable fastening device may be used, though consideration must be made for the requirement that the grille 10 be structurally resistant to wind and vibration forces generated when the automobile 18 is in motion.

Figure 4:
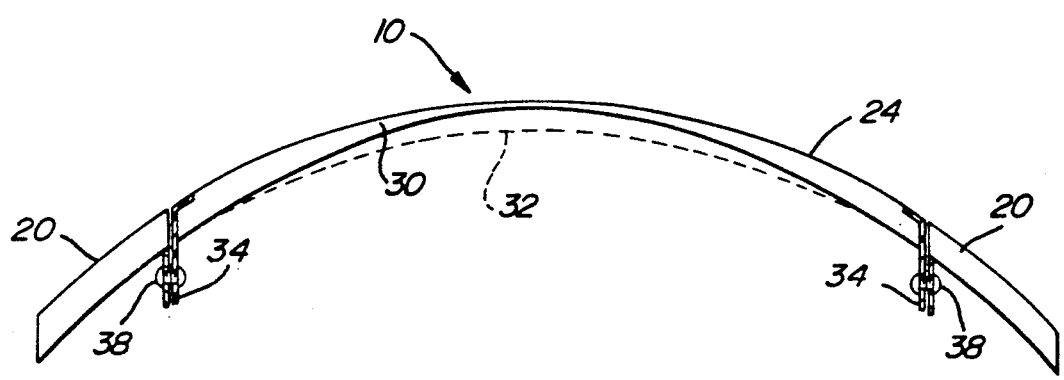
FIG. 4 is a cross-sectional view of the automobile front end sheet metal panels taken along line 4—4 of FIG. 2 in accordance with the preferred embodiment of this invention.

With reference now to FIG. 4, the lower support member 24 is preferably formed to have a section modulus which varies along its length. For illustrative purposes, the cross-section of the lower support member 24 is shown to be tapered having a minimum depth at an intermediate portion 30 along the lower support member's length. The extent of the change in depth is demonstrated by the phantom line indicating the profile of an unmodified lower support member 32. In this example, the 1.25 inch depth of the lower support member 24 was tapered to a depth of 0.5 inches at the intermediate portion 30. Though illustrated as a gradual taper with only one minimum cross section, it will be readily appreciated by those skilled in the art that a plurality of reduced sections could be formed to provide a plurality of elastic regions along the length of the lower support member 24. However, for purposes of the present discussion the construction of the grille 10 of the present invention will be described with reference to only one reduced section modulus located at the intermediate portion 30 of the lower support member 24.

For purposes of illustration, the section modulus I/c for the upper, lower and intermediate support members 22, 24 and 28 if chosen to be a rectangular cross section, is $bh^2/6$, where $I=bh^3/12$, $c=h/2$, b is the vertical thickness of the member and h is the horizontal depth of the member in the plane of the impact force. By substituting this value within the previously described relationship for maximum stress noted above, it can be seen that a decrease in the depth h of the lower support member 24 produces an increase in the maximum stress in the lower support member 24 according to the equation:

$$S = 6M/bh^2.$$

Now with reference to the deflection equation noted above, and noting again that $I=bh^3/12$, the relationship between the depth h and the deflection f can be represented by the formula:

$$f = 12Pl^3/mEbh^3$$

wherein a decrease in the depth h of the lower support member 24 produces an increase in the measurable deflection f in the lower support member 24, given a constant deflection load P, beam span l, and thickness b. However, by combining the above equations, it can also be seen that:

$$f/S = 2Pl^3/hMEm$$

wherein a decrease in the depth h of the lower support member 24 produces a proportional increase in the deflection to stress ratio f/S given a constant bending moment M, deflection load P and beam span l. Thus, with a reduced section modulus there can be additional deflection within the lower support member 24 while remaining within a predetermined stress limit, such as the maximum yield strength of the material of the grille 10.

Obviously, the bending characteristics predicted from the above calculation will be affected by any additional structural members of the grille 10, such as the vertical support members 26 and the vertical grille members 42. Accordingly, the analytical discussion above is merely intended to illustrate the beneficial influence that a reduced section modulus has on the grille's bending characteristics according to the preferred embodiment of the present invention.

As indicated in FIG. 4, in the preferred embodiment the ends of the lower support member 24 have anchor ends 34 to attach the lower support member 24 (i.e. the grille) to the downward extending hood structure 20. Accordingly, all of the bending in the lower support member 24 as a result of a frontal impact will occur between the anchor ends 34. The maximum deflection in the lower support member 24, as well as that of the entire grille 10, will occur at the intermediate portion 30 of the lower support member 24 at which the minimum depth h and, therefore, the minimum section modulus I/c, is present.

Figure 5:
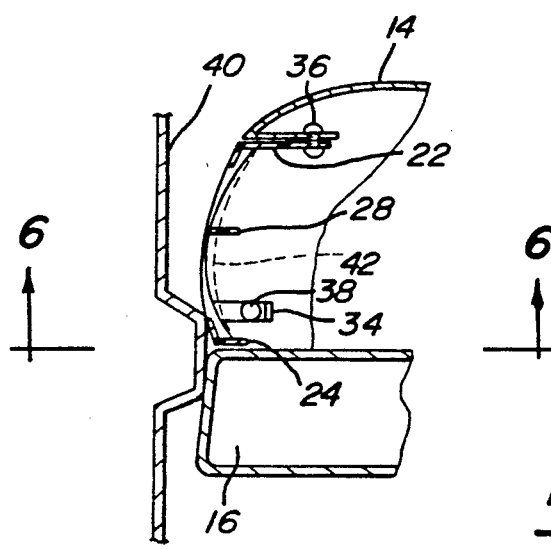
FIG. 5 is a cross-sectional view of the automobile front end of FIG. 1 illustrating an impact with an obstacle in accordance with the preferred embodiment of this invention.
Figure 6:
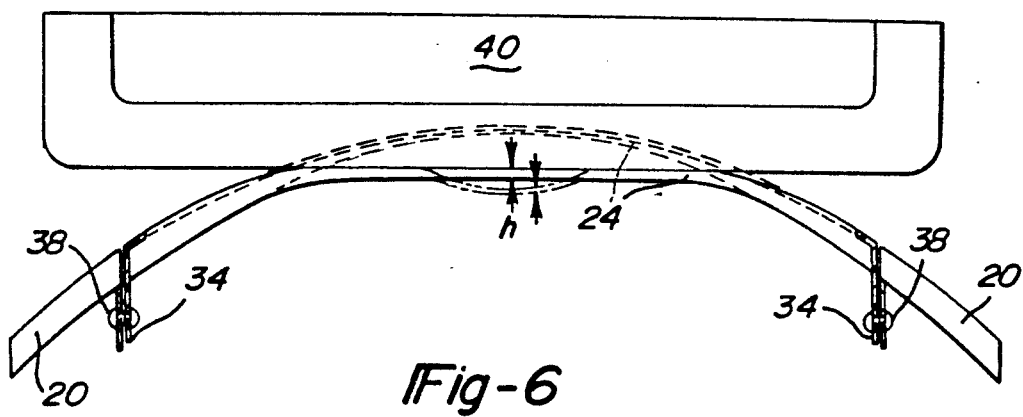
FIG. 6 is a cross-sectional view rotated 90° of the automobile front end taken along line 6—6 of FIG. 5 in accordance with the preferred embodiment of this invention.

The influence of the above-described structure upon the impact-resilience of the grille 10 can be seen in FIGS. 5 and 6. FIG. 6 shows the impact with an obstacle 40 upon the grille 10 as seen from below as a bottom view of the lower support member 24. With the anchor ends 34 of the lower support member 24 attached firmly to the downward extending hood structure 20, the taper of the depth h of the lower support member 24 produces a gradual deflection of the lower support member 24, with the flexure being concentrated at the intermediate portion 30 where the minimum section modulus occurs, all this occurring within the yield limit of the grille material so that the lower support member 24 may return to its original position after impact.

FIG. 5 shows a cross-sectional side view of the grille 10 in which the deflection of the grille 10 can be seen to be localized in the lower support member 24 with minimal effect on the intermediate and upper support members 28 and 22. According to the teachings of the present invention, it is practical to provide the lower support member 24 with a reduced section modulus in order to achieve the benefits of the present invention within the entire grille 10. With the degree of elasticity provided, the lower support member 24 is able to follow the stroke of the bumper 16, as shown, remaining flush with the bumper 16 at both the pre-impact and post-impact positions. As can also be seen, the vertical grille members 42 also sustain a bending moment between the intermediate member 28 and the lower support member 24. Accordingly, it may be desirable to provide the vertical grille members 42 with similar structural modifications as the lower support member 24 to provide elastic deformation due to impact yet no visible structural effect upon post impact inspection.

A significant advantage of the grille 10 of the present invention is that reducing the section modulus at one or more predetermined points along the lower support member 24 eliminates the need for the grille 10 to be able to pivot about the upper support member 22 during the stroke of the bumper 16 due to impact, allowing the upper support member 22 to be rigidly attached to the automobile front end portion 18. Consequently, no additional hardware or special resilient fasteners are needed between the grille 10 or the upper or lower support member 22 or 24 and the automobile front end portion 18. An added benefit is that the grille 10 can be mounted flush with its surroundings, including the bumper 16. As a result, both the styling and the aerodynamic characteristics of the grille 10 and the automobile front end portion 18 are greatly improved.

In addition, the lower support member 24 can also be attached to the automobile front end portion 18 at its anchor ends 34 to firmly anchor the grille 10 to the automobile front end portion 18. With the reduced section modulus located at the intermediate portion 30 of the lower support member 24, the deflection of the lower support member 24 can be localized at the intermediate portion 30, allowing complete restriction of the anchor ends 34 without sustaining any structural damage. The grille 10 can thereby be firmly secured to the automobile front end portion 18 to withstand wind and vibrational forces while the automobile is in motion.

Another significant advantage of the present invention is that the section modulus of the lower support member 24 or other structural member can be readily modified by varying its depth h for experimental purposes. As a result, the optimum section modulus for different applications can be experimentally ascertained by either modifying the mold which forms the lower support member 24, or by mechanical means to contour and remove material from the lower support member's cross section.

Accordingly, the present invention provides an automobile grille 10 which is able to withstand a predetermined impact without fracturing, by elastically deforming while also being particularly suitable for mounting flush with an impact-absorbing bumper 16 such that the grille 10 is capable of resiliently deflecting with the stroke of the bumper 16. The reduced section modulus of the lower support member 24 of the grille 10 localizes the deflection of the grille 10, thereby reducing the flexure of the remainder of the grille 10 and allowing the grille 10 to be rigidly attached to the automobile front end portion 18 without the need for additional pivoting hardware or resilient brackets to support the grille 10. This feature allows the grille 10 of the present invention to have a substantially lower cost and weight than grille assemblies of the prior art. Finally, by the grille 10 being securable to the automobile front end portion 18 at both its upper and lower support members 22 and 24, there is provided added structural resistance to adverse environmental influences such as wind and vibration.

While the invention has been described in terms of a preferred embodiment, it is apparent that other forms could be adopted by one skilled in the art. For example, the intermediate member 28 or the vertical support members 26 could be modified, in addition to or in lieu of the lower support member 24, so as to have a reduced section modulus, forming an additional point at which flexure in the grille 10 will be localized. Additionally, diagonal support members could also be provided having modified section modulii. Accordingly, the scope of the invention is to be limited only by the following claims.

What is claimed is:

1. An elastic automobile grille for an automobile having a bumper, said automobile grille comprising:
   a body member having a first segment and a second segment;
   fastening means mounted to said body member for securing said automobile grille to said automobile; and
   a plurality of support members secured to one of said first segment and second segment of said body member, said plurality of support members being formed from a material having a predetermined yield strength, said plurality of support members having a variable section modulus along a portion thereof so as to provide a predetermined elastic deformation of said plurality of support members at said portion without exceeding said predetermined yield strength of said material whereby said predetermined elastic deformation of said plurality of support members provides a degree of resiliency to said automobile grille such that said automobile grille can be rigidly attached to said automobile by said fastening means and such that said automobile grille may sustain a predetermined elastic deformation upon said bumper being impacted without said automobile grille exceeding said predetermined yield strength of said material.

2. The automobile grille of claim 1 wherein said variable section modulus has a predetermined minimum section modulus at an intermediate point of said plurality of support members.

3. The automobile grille of claim 1 wherein said variable section modulus has a predetermined minimum section modulus at a plurality of points along said plurality of support members.

4. The automobile grille of claim 1 wherein said fastening means rigidly attaches said automobile grille to said automobile such that said automobile grille is substantially prevented from pivoting with respect to said fastening means when said automobile grille sustains said predetermined elastic deformation.

5. The automobile grille of claim 1 wherein said plurality of said support members are elongate support members, said elongate support members each extending from said one of said first and second segments to said other of said first and second segments, said automobile grille being attached to said automobile by said fastening means.

6. The automobile grille of claim 1 wherein said plurality of support members are secured to both said first segment and said second segment of said body member.

7. The automobile grille of claim 6 wherein said second segment of said body member is an elongate member defining a lower extremity of said automobile grille, said elongate member terminating at a first end and an oppositely disposed second end, said elongate member further having a variable section modulus along a portion thereof between said first end and said second end so as to provide a predetermined elastic deformation of said elongate member at said portion without exceeding said predetermined yield strength of said material.

8. The automobile grille of claim 7 wherein said elongate member is disposed adjacent said bumper of said automobile.

9. An automobile grille for an automobile having an impact-absorbing bumper which is movable upon impact with an object such that said impact-absorbing bumper subsequently returns to a pre-impact position after said impact is dissipated, said automobile grille comprising:
  a body portion extending across a front end portion of said automobile, said body portion having an upper end and a lower end;
  an upper segment portion located at said upper end of said body portion, said upper segment portion having fastening means for attaching said body portion to said automobile;
  a lower segment portion located at said lower end of said body portion; and
  a plurality of elongate support members interposed said upper and lower segment portions of said body portion, said plurality of elongate support members each having a first end attached to said upper segment portion and an oppositely disposed second end attached to said lower segment portion, said plurality of elongate support members and said lower segment portion being formed from a material having a predetermined yield strength, said plurality of elongate support members having a minimum section modulus along at least one portion thereof so as to provide a predetermined elastic deformation of said plurality of elongate support members at said at least one portion without exceeding said predetermined yield strength of said material;
  whereby said predetermined elastic deformation of said plurality of elongate support members provides a degree of resiliency to said automobile grille such that when said automobile grille is rigidly attached to said automobile with said fastening means said automobile grille may sustain a predetermined elastic deformation upon said impact-absorbing bumper being impacted without said automobile grille exceeding said predetermined yield strength of said material.

10. The automobile grille of claim 9 further comprising a plurality of vertical structural members extending between and attaching to said upper segment portion and said lower segment portion.

11. The automobile grille of claim 9 wherein said automobile grille is mounted to be substantially flush with said impact-absorbing bumper and said front end portion of said automobile.

12. The automobile grille of claim 9 wherein said lower segment portion is located adjacent to said impact-absorbing bumper.

13. The automobile grille of claim 9 further comprising an intermediate support member disposed horizontally across said body portion and located between said upper segment portion and said lower segment portion, said intermediate support member further being attached to said plurality of elongate support members.

14. The automobile grille of claim 9 wherein said lower segment portion is rigidly attached to said automobile such that said automobile grille is prevented from pivoting with respect to said upper segment portion when said bumper impast-absorbing sustains an impact.

15. The automobile grille of claim 9 wherein said upper segment portion has a first end and an oppositely disposed second end, said fastening means rigidly attaching said automobile grille to said automobile at said first and second ends of said upper segment portion.

16. The automobile grille of claim 1 further comprising at least two end members, said at least two end members being rigidly mounted to said first segment and said second segment to define oppositely disposed end extremities of said body member.

17. The automobile grille of claim 16 further comprising an intermediate support member having one end attached to one of said at least two end members and an opposite end attached to the other of said at least two end members, said intermediate support member further being attached to each of said plurality of support members to provide intermediate support for said plurality of support members.

18. An elastic automobile grille for an automobile having a bumper, said automobile grille comprising:
  a body member having a first segment;
  a second segment; and
  at least two end members, each of said at least two end members having an end rigidly mounted to said first segment and an opposite end rigidly mounted to said second segment such as to define end extremities of said body member;
  fastening means mounted to said body member for securing said automobile grille to said automobile; and
  a plurality of support members secured to at least one of said at least two end members of said body member, said plurality of support members and one of said first and second segments being formed from a material having a predetermined yield strength, said plurality of support members and one of said first and second segments having a variable section modulus along a portion thereof so as to provide a predetermined elastic deformation of said one of said first and second segments and said plurality of support members at said portion without exceeding said predetermined yield strength of said material whereby said predetermined elastic deformation of said one of said first and second segments and said plurality of support members provides a degree of resiliency to said automobile grille such that said automobile grille can be rigidly attached to said automobile by said fastening means and such that said automobile grille may sustain a predetermined elastic deformation upon said bumper being impacted without said automobile grille exceeding said predetermined yield strength of said material.

19. The automobile grille of claim 18 wherein said variable section modulus has a predetermined minimum section modulus at an intermediate point of said plurality of support members and said one of said first and second segments.

20. The automobile grille of claim 18 wherein said variable section modulus has a predetermined minimum section modulus at a plurality of points along said plurality of support members and said one of said first and second segments.

21. The automobile grille of claim 18 wherein said fastening means rigidly attaches said body member to said automobile such that said body member is substantially prevented from pivoting with respect to said fastening means when said automobile grille sustains said predetermined elastic deformation.

22. The automobile grille of claim 18 wherein said plurality of support members are elongate support members, said plurality of elongate support members each extending from said one of said at least two end members to the other of said at least two end members, said body member being attached to said automobile by said fastening means.

23. The automobile grille of claim 1 wherein said plurality of support members are secured to both said first and second segment of said body member.

24. The automobile grille of claim 1 wherein said one of said first and second segments formed from said material having a predetermined yield strength is disposed adjacent said bumper of said automobile.

25. The automobile grille of claim 18 further comprising an intermediate support member having one end attached to one of said first and second segments of said body member and an opposite end attached to the other of said first and second segments of said body member, said intermediate support member further being attached to each of said plurality of support members to provide intermediate support for said plurality of support members.

* * * * *

UNITED STATES PATENT AND TRADEMARK OFFICE
CERTIFICATE OF CORRECTION

PATENT NO. : 5,205,597

DATED : April 27, 1993

INVENTOR(S) : Lee A. Chase

It is certified that error appears in the above-identified patent and that said Letters Patent is hereby corrected as shown below:

Column 2, line 54, delete "taugh" and insert ---- taught ----.

Column 2, line 57, delete "undesirably" and insert ---- undesirable ----.

Column 4, line 37, delete "likehood" and insert ---- likelihood ----.

Column 5, line 34, after "plexity" insert ---- in that special attachment hardware is not needed to ----.

Column 6, line 35, delete "preferable" and insert ---- preferably ----.

UNITED STATES PATENT AND TRADEMARK OFFICE
CERTIFICATE OF CORRECTION

PATENT NO. : 5,205,597

DATED : April 27, 1993

INVENTOR(S) : Lee A. Chase

It is certified that error appears in the above-identified patent and that said Letters Patent is hereby corrected as shown below:

Column 12, line 26, delete "bumper impast-absorbing" and insert ---- impact-absorbing bumper ----.

Signed and Sealed this

Fifteenth Day of March, 1994

Attest:

BRUCE LEHMAN

Attesting Officer

Commissioner of Patents and Trademarks